United States Patent
Haley et al.

(10) Patent No.: US 6,638,156 B2
(45) Date of Patent: *Oct. 28, 2003

(54) SECONDARY HALVING APPARATUS FOR POULTRY

(75) Inventors: Brandon C. Haley, Springdale, AR (US); Marshall Vanderpool, Bentonville, AR (US); Kelvin D. Lasse, Springdale, AR (US); Larry R. Welch, Siloam Springs, AR (US); James A. Ruff, Springdale, AR (US)

(73) Assignee: Tyson Foods, Inc., Springdale, AR (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/264,774

(22) Filed: Oct. 4, 2002

(65) Prior Publication Data

US 2003/0045223 A1 Mar. 6, 2003

Related U.S. Application Data

(63) Continuation-in-part of application No. 09/808,562, filed on Mar. 14, 2001, now Pat. No. 6,475,076.

(51) Int. Cl.[7] .............................................. A22C 21/00
(52) U.S. Cl. ........................................ 452/167; 452/166
(58) Field of Search ................................. 452/163, 166, 452/167, 153

(56) References Cited

U.S. PATENT DOCUMENTS

| | | | | |
|---|---|---|---|---|
| 3,201,823 A | * | 8/1965 | Mathews | 452/167 |
| 4,271,561 A | * | 6/1981 | Lewis | 452/167 |
| 4,593,435 A | | 6/1986 | Martin et al. | |
| 4,815,168 A | | 3/1989 | van den Nieuwelaar et al. | |
| 5,019,013 A | | 5/1991 | Hazenbroek | |
| 5,035,673 A | | 7/1991 | Hazenbroek | |
| 5,154,665 A | | 10/1992 | Hazenbroek | |
| 5,184,974 A | | 2/1993 | Cornelissen et al. | |
| 5,472,377 A | | 12/1995 | Andrews et al. | |
| 5,484,333 A | | 1/1996 | Martin et al. | |
| 5,947,811 A | * | 9/1999 | Hazenbroek et al. | 452/167 |
| 6,475,076 B1 | * | 11/2002 | Rheingans et al. | 452/167 |

* cited by examiner

Primary Examiner—Thomas Price
(74) Attorney, Agent, or Firm—Blackwell Sanders Peper Martin LLP; Mark E. Stallion

(57) ABSTRACT

An apparatus for cutting poultry carcasses as they are continuously conveyed by a shackle conveyor having a plurality of shackles. The inventive apparatus comprises a gap provided between two rails. The rails are positioned such that the exterior of the carcass adjacent the spine will contact and slide along the back rail while the front rail will pivot the front half of the carcass backward with respect to the back half, thereby placing the skin connecting the two halves in a peeling position with respect to the front half. The apparatus further comprises a blade positioned for cutting a segment of skin while the carcass is in this stretched position such that at least most of the segment of skin remains attached to the back half.

16 Claims, 14 Drawing Sheets

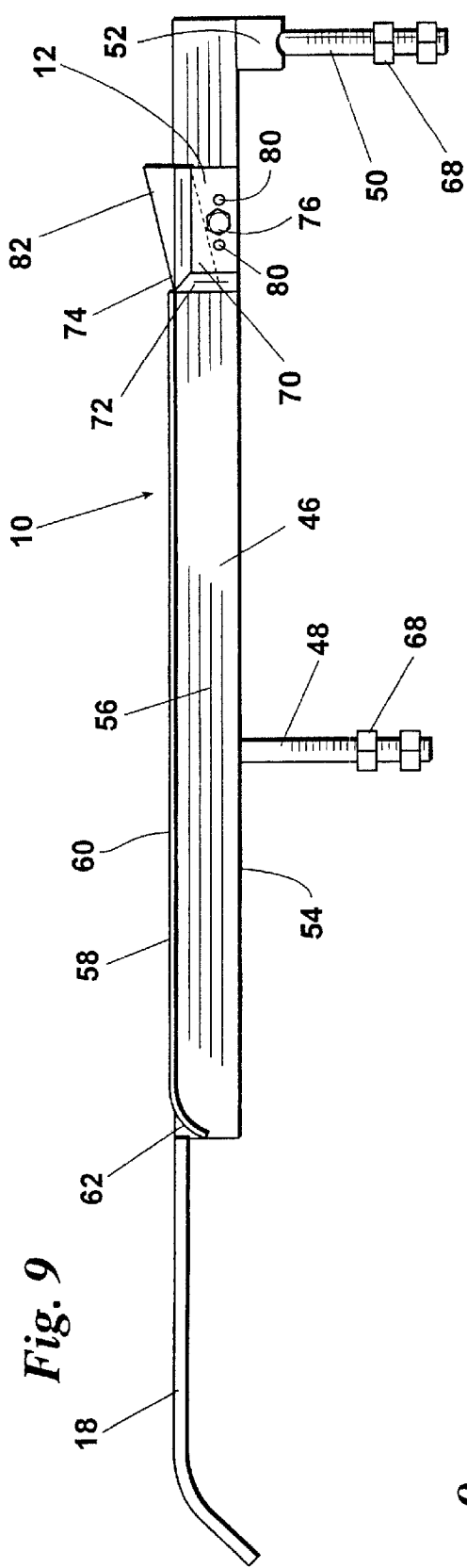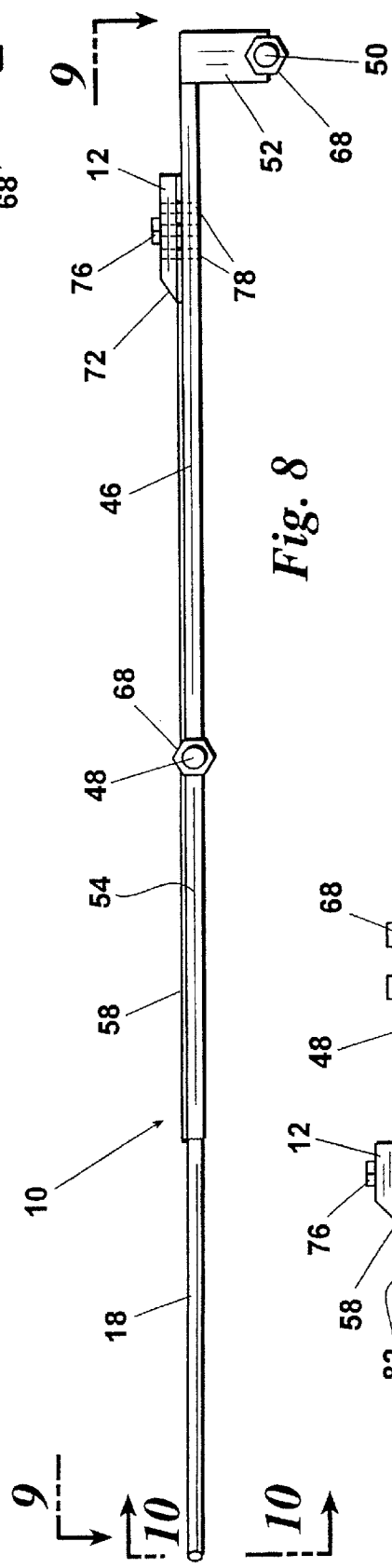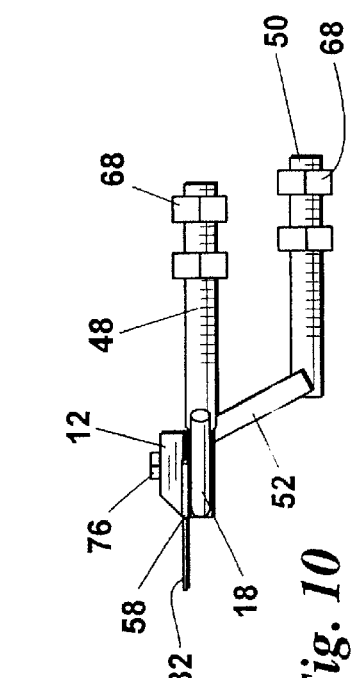

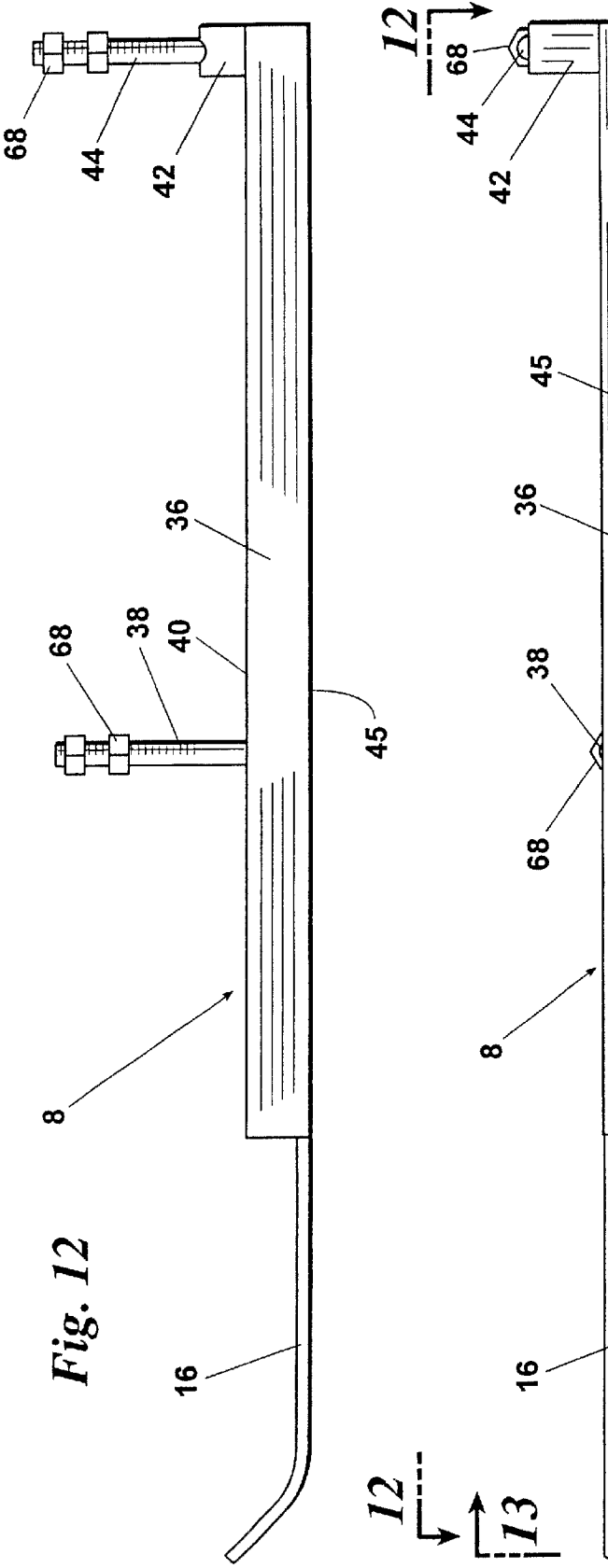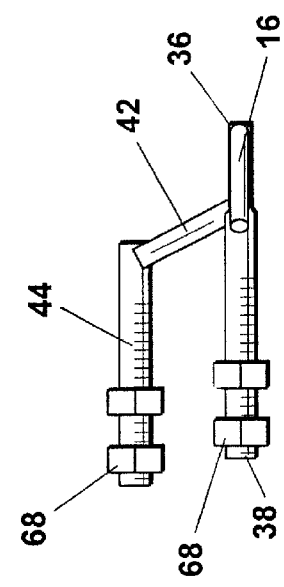

SECONDARY HALVING APPARATUS FOR POULTRY

CROSS-REFERENCE TO RELATED APPLICATION

This application is a continuation-in-part of U.S. patent application Ser. No. 09/808,562, filed Mar. 14, 2001, now U.S. Pat. No. 6,475,076.

BACKGROUND OF INVENTION

1. Field of Invention

This invention relates generally to apparatuses for dividing poultry carcasses to produce front half and back half products and, more particularly, to halving chicken carcasses.

2. Background Art

When processing chicken and other poultry, a two-step procedure is typically used to divide and cut the poultry carcass laterally into a front half product and a back half product. The front half will typically comprise the breasts, keel, wings, and a portion of the back. The back half, or saddle, typically comprises the legs, thighs, and the remainder of the back. In the first (primary) step of the halving procedure, most of the skin around the eviscerated pack is cut and the backbone is at least partially broken, or cut, such that the front half is left hanging from the back half by substantially only a segment of skin tissue (possibly including some meat) extending between the front and back sections of the backbone. In the next (secondary) step, this segment is cut so that the front half is completely separated from the back half of the carcass.

A typical primary halving apparatus is described in U.S. Pat. No. 4,593,435. Eviscerated poultry carcasses are conducted, in inverted position, through the apparatus of U.S. Pat. No. 4,593,435 by means of both a shackle conveyor and a screw-type conveyor. Within the apparatus, each carcass is first delivered to an inclined, rotating cog wheel having an array of teeth formed around the circumference thereof. The cog wheel also has a slot provided therein for receiving a stationary severing blade. The teeth of the cog wheel engage the front skin covering the evisceration vents of the poultry carcasses and hold the carcasses in tensioned position such that the stationary blade engages each carcass at the base of the keel and cuts the connecting tissue webs disposed between the breast and thigh portions of the carcass. Following the cutting operation, each carcass is delivered to an inclined, counter-rotating conical auger which engages the enlarged opening formed by the cutting operation and effects a downward bending movement of the front half about a longitudinal guide rod. This bending operation breaks the carcass backbone into two separate pieces such that the front half of the carcass hangs loosely from the back half by means of only a segment of back skin tissue (possibly including some meat) which remains attached to both the forward and rearward backbone sections.

Heretofore, the front and back sections of a "halved" poultry carcass of the type provided by the apparatus and method of U.S. Pat. No. 4,593,435 have been separated from each other by simply cutting the segment of skin which extends between the separated backbone sections. Some typical secondary halving devices utilize a rotating circular blade into which the birds are guided. The rotating blade makes a square cut such that none of the connecting skin or meat is left hanging from the back half (i.e., the saddle) of the carcass. Other typical secondary halvers utilize stationary blades which also provide a square cut on the saddle.

Following separation, the front half and back half carcass sections can be processed, as desired, in separate sectioning operations to produce wings, breasts, thighs, and the like. The back half sections are also commonly sold in one piece without further removal and sectioning.

Unfortunately, when poultry carcasses are halved and separated in the manner described above, the segment of back skin in question remains attached to the front half product and is typically not recovered in a desirable manner. Commonly, after the front half of the poultry carcass is subjected to further sectioning operations, the skin and meat attached to the center of the forward backbone section will simply be rendered along with other by-products of the sectioning process.

In addition to undesirably removing all of the connecting skin and meat from the saddle, the secondary halving devices heretofore used in the art typically contact and create forces on the rib cage of the carcass sufficient to cause some of the ribs to be broken. Such rib breakage detrimentally affects the efficiency of subsequent deboning operations by significantly reducing the amount of rib meat which can be removed as a part of the breast filet.

BRIEF SUMMARY OF INVENTION

The present invention provides a secondary halving apparatus which satisfies the needs and alleviates the problems discussed above. The inventive apparatus provides increased leg quarter yield by leaving a flap of skin and meat attached to the back half of the carcass. Additionally, the inventive system applies pressure to the spine of the carcass, rather than the to ribs, so that rib breakage is greatly reduced. Moreover, the inventive apparatus is simpler and less costly than other devices, requires less maintenance, is more reliable, and is significantly easier to clean and sanitize.

The present invention provides an apparatus for cutting poultry carcasses as they are continuously conveyed by a shackle conveyor having a plurality of shackles. The poultry carcasses conveyed to the inventive apparatus have been previously processed such that each of the poultry carcasses includes a back half comprising two legs retained in the shackles and a front half which has been partially cut away from the back half. The back half further comprises a back portion of a spine of the poultry carcass and the front half comprises a front portion of the spine. The front half hangs from the back half by at least a segment of skin extending between the back and front portions of the spine. The inventive apparatus comprises a back rail and a front rail. The front rail is positioned adjacent to the back rail such that a gap is provided between the rails. The gap is positioned such that the poultry carcasses will travel into the gap as they are conveyed by the shackle conveyor. The back rail and the front rail are positioned with respect to each other and with respect to the shackle conveyor such that, as each poultry carcass travels into the gap, the exterior thereof adjacent the spine will contact and slide along the back rail while the front rail will operate to pivot the front half of the carcass backward with respect to the back half to thus place the segment of skin in a peeling position with respect to the front portion of the spine. The apparatus further comprises cutting means positioned for cutting the segment of skin from the front portion of the spine while the segment of skin is in the peeling position such that the front half is separated from the back half and at least most of the segment of skin remains attached to the back half.

Further objects, features, and advantages of the present invention will be apparent to those skilled in the art upon examining the accompanying drawings and upon reading the following description of the preferred embodiments.

The cutting blade on halver is shown to be a stationary blade as much with a kitchen knife. The new design can have a stationary circular blade that is locked down by a bolt through the center of the blade. When the blade dulls (at the point of contact on the blade) it is selectively rotatable for obtaining a fresh cutting edge, by loosening the bolt and selectively rotating the blade 45 degrees. Thus, a sharp edge will be exposed to the product. Only a small portion of the circular blade is used to cut the product (roughly 30 degrees).

The circular blade can be rotatably mounted and having a drive for effecting rotation. The rotating blade will cut product. The circular blade is likely to break less often than the straight stationery blade.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 8 provides an elevational outside view of back rail structure 10.

FIG. 9 provides a plan view of back rail structure 10 as seen from perspective 9—9 shown 15 in FIG. 8.

FIG. 10 provides an elevational inlet end view of back rail structure 10 as seen from perspective 10—10 shown in FIG. 8.

FIG. 11 provides an elevational inside view of front rail structure 8.

FIG. 12 provides a plan view of front rail structure 8 as seen from perspective 12—12 20 shown in FIG. 11.

FIG. 13 provides an elevational inlet end view of front rail structure 8 as seen from perspective 13—13 shown in FIG. 11.

DETAILED DESCRIPTION OF INVENTION

Figure 1:
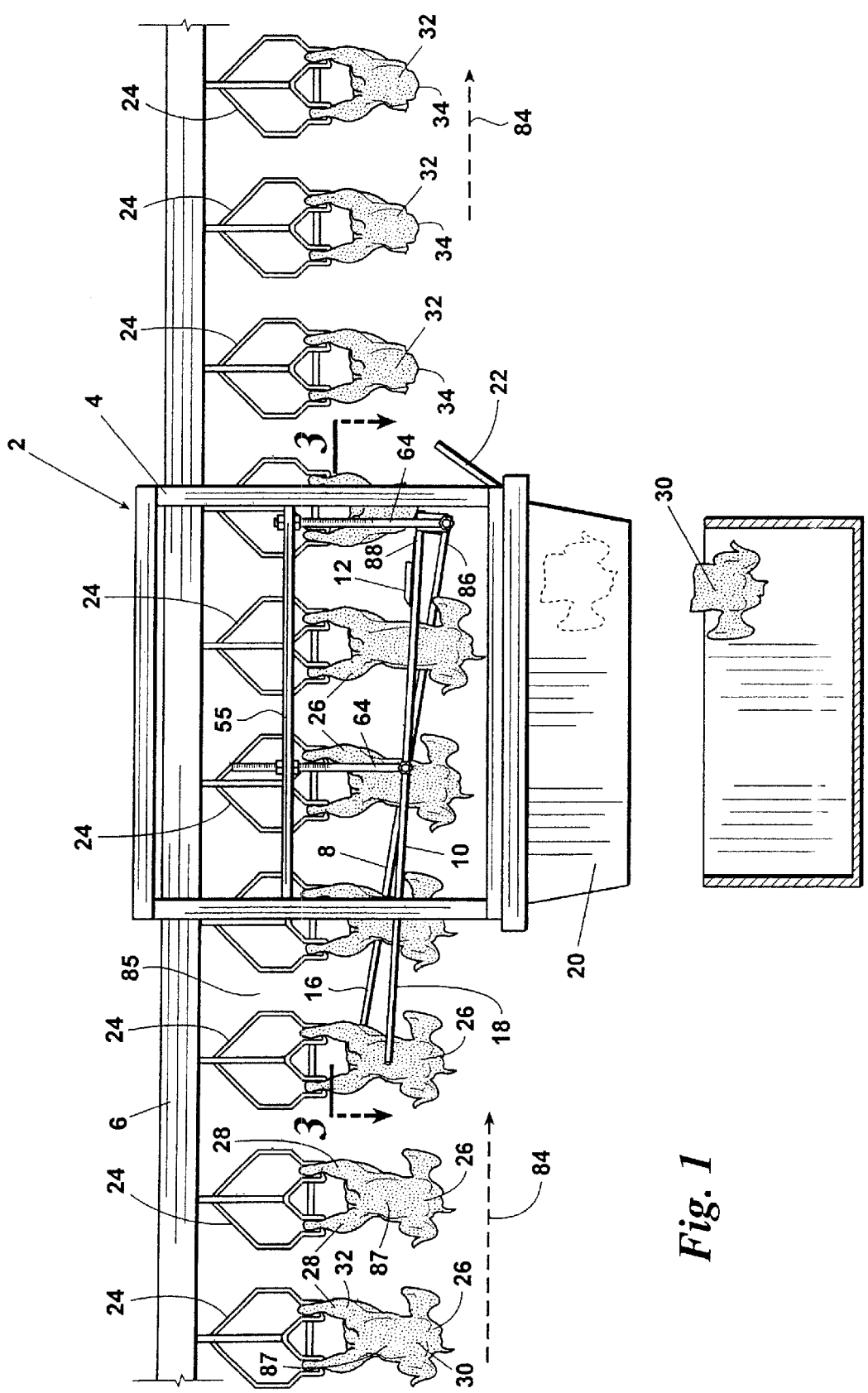
FIG. 1 provides an elevational back view of an embodiment 2 of the inventive secondary halving apparatus.
Figure 2:
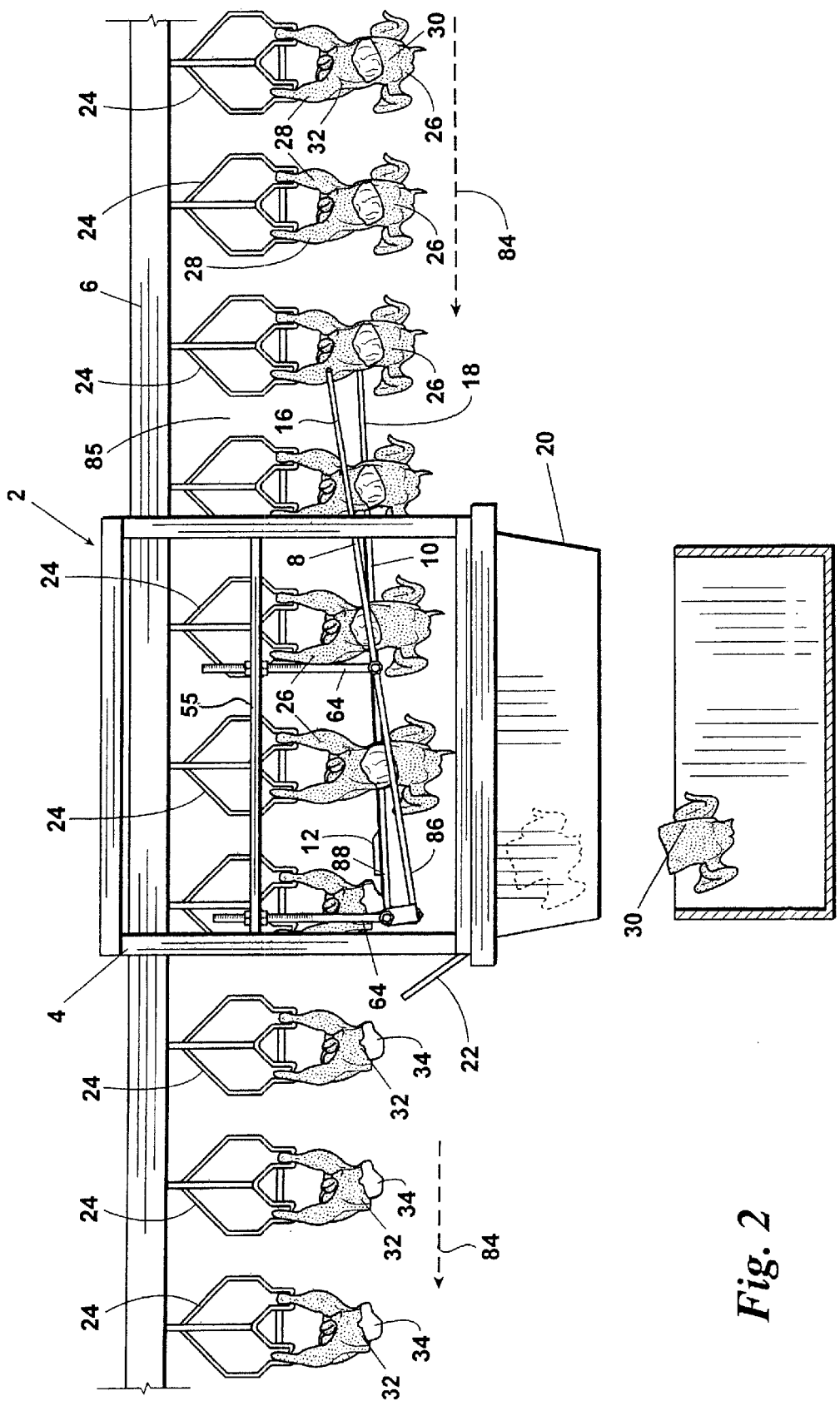
FIG. 2 provides an elevational front view of inventive apparatus 2.

One embodiment of the present invention comprising inclined front and back rails having a cutting means attached thereto teaches a novel apparatus and method for halving poultry carcasses as they are continuously conveyed by a shackle conveyor.

The details of the invention and various embodiments can be better understood by referring to the figures of the drawing.

An embodiment 2 of the inventive secondary halving apparatus is depicted in FIGS. 1–15, Inventive apparatus 2 comprises: a frame 4 positionable on a shackle conveyor 6; a front rail structure 8 suspended within frame 4; a back rail structure 10 suspended within frame 4; a blade assembly 12 removably secured on back rail 10; a gap 14 formed between rails 8 and 10; a pair of outwardly curved rods 16 and 18 provided on the initial ends of rails 8 and 10; a product bin 20 provided on the bottom of frame 4 for receiving cut product; and a product deflector wall 22 extending upwardly from the trailing end of bin 20 to prevent product from dropping outside of the bin.

Shackle conveyor 6 comprises a plurality of shackles 24 which continuously deliver poultry carcasses 26 through inventive apparatus 2. The legs 28 of carcasses 26 are retained in shackles 24 such that carcasses 26 hang upside down. Each eviscerated poultry carcass 26 has already been delivered through a primary halving device (not shown) such that the carcass comprises a front half 30 which hangs from the back half (saddle) 32 by at least a segment of skin 34 which extends between the backbone portions of the two halves. As mentioned above, the front half 30 of the carcass typically includes the wings, breasts, keel, and the forward section of the back. The back half typically includes the thighs, legs, and the remaining rearward portion of the back.

Poultry carcasses 26 can generally be any type of eviscerated fowl. Examples of preferred 5 types of fowl include chickens, turkeys, ducks, geese, and guineas. Poultry carcasses 26 are preferably eviscerated chicken carcasses.

Front rail structure 8 preferably comprises: an elongate bar, rod, or similar structure 36 having curved rod 16 extending from the initial end thereof; a first attachment bolt 38 or similar attachment structure extending laterally from the mid-portion of the outer edge 40 of bar 36; a spacer 42 extending upwardly from the rearward end of outer edge 40; and a second attachment bolt 44 or similar structure extending laterally outward from the upper end of spacer 42.

The back rail assembly 10 is close to a mirror image of front rail structure 8 in that back rail structure 10 comprises: an elongate bar, rod, or similar structure 46 having outwardly curved rod 18 secured to the initial end thereof; a first attachment bolt 48 extending laterally outward from the mid-portion of elongate bar 46; and a second attachment bolt 50 extending laterally outward from a vertical spacer 52 secured at the rearward end of the outer edge 54 of bar 46. However, in contrast to the spacer 42 of front rail structure 8, the spacer 52 of back rail structure 10 extends downward rather than upward. Additionally, back rail structure 10 includes blade assembly 12 provided nearer the rearward end of the upper surface 56 of elongate bar 46 and preferably also includes an elongate, small diameter, rounded rod 58 or similar rounded structure secured or formed along the inner edge 60 of the upper surface 56 of bar 46. Rod 58 extends to blade assembly 12 and preferably has an outwardly curved forward end 62.

Front rail 8 and back rail 10 can be adjustably suspended within frame 4 using four T-bolts or similar structures 64. Provided at the lower ends of T-bolts 64 are lateral pipe or tubing segments 66 which are received on the attachment bolts 38, 44, 48, and 50 of rail structures 8 and 10. Lateral segments 66 are adjustably held in fixed position on bolts 38, 44, 48, and 50 by nuts 68. The upper ends of T-bolts 64 are preferably adjustably retained in support members 55 of frame 4 using nuts or other threaded attachments 57 which will allow vertical adjustment of the T-bolts 64 and rail structures 8 and 10.

The cutting blade assembly 12 employed in inventive apparatus 2 preferably comprises: a retaining plate 70 having beveled inner and forward edges 72 and 74; an attachment bolt 76 secured to and extending upwardly from back rail 10; a pair of guide pins 78 extending upwardly from the upper surface 56 of back rail 10; a corresponding pair of apertures 80 formed in retaining plate 70 for receiving guide pins 78 to thereby align and hold retaining plate 70 such that the inner edge 72 thereof does not extend beyond the inner edge 60 of back rail 10; and a replaceable blade 82 which is removably clamped between retaining plate 70 on the upper surface 56 of back rail 10.

Figure 3:
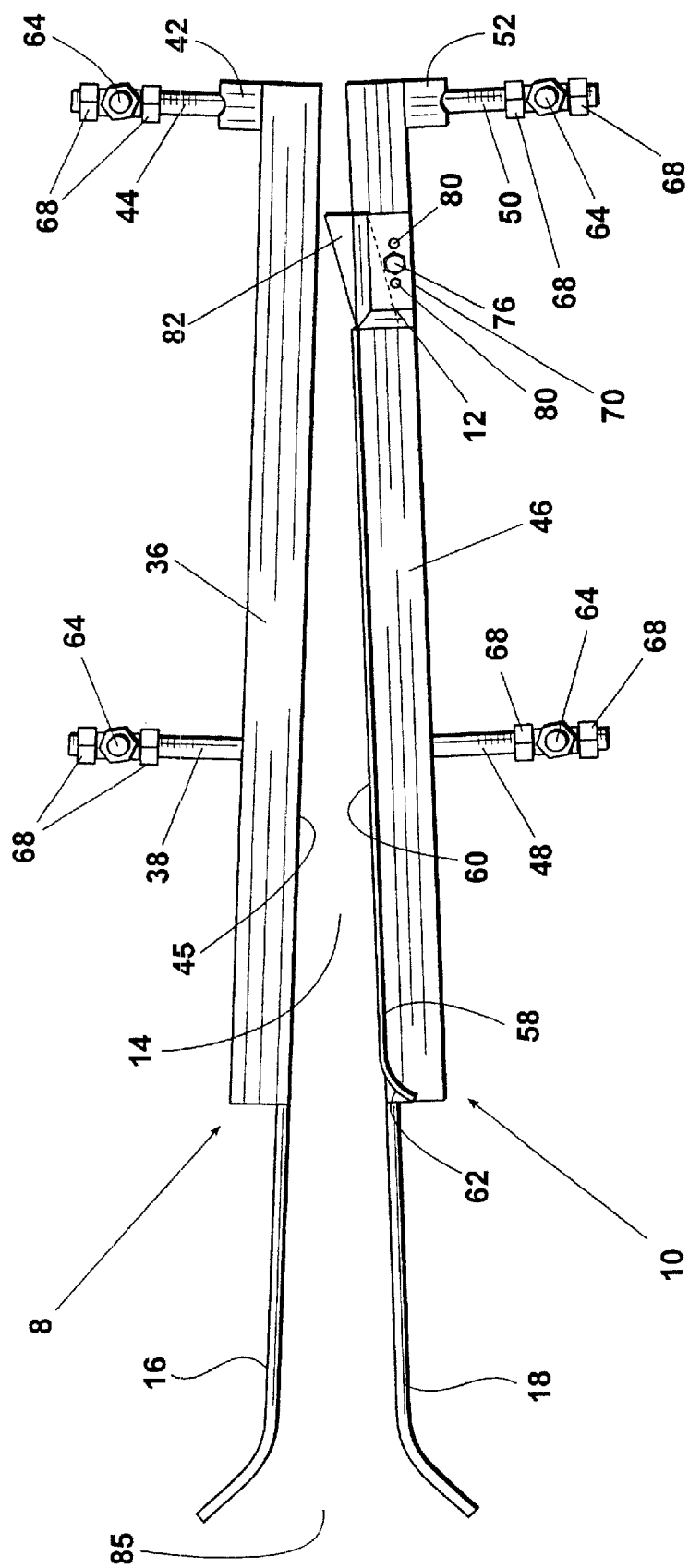
FIG. 3 provides a top view of front and back rail structures 8 and 10 employed in 10 inventive apparatus 2 as seen from perspective 3—3 shown in FIG. 1.
Figure 7:
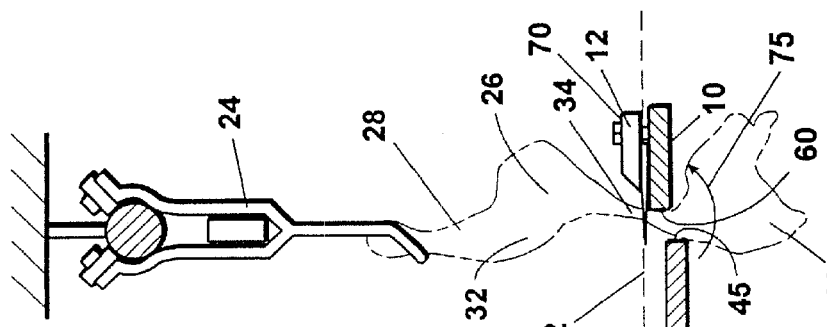
FIGS. 4–7 provide sequential inlet end views of a poultry carcass 26 being received, positioned, and cut in inventive apparatus 2.
Figure 6:
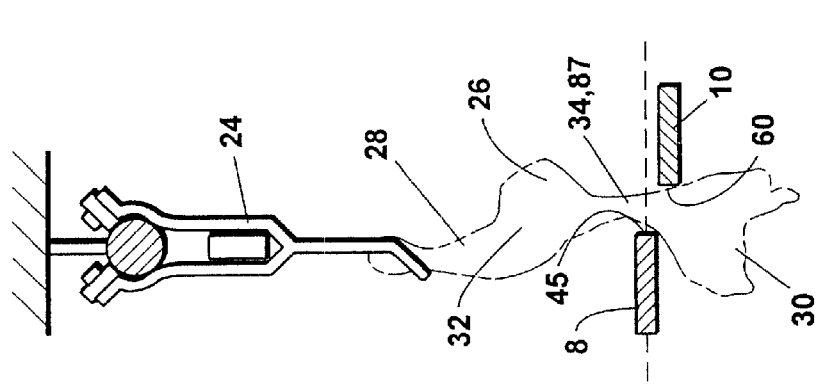
Figure 5:
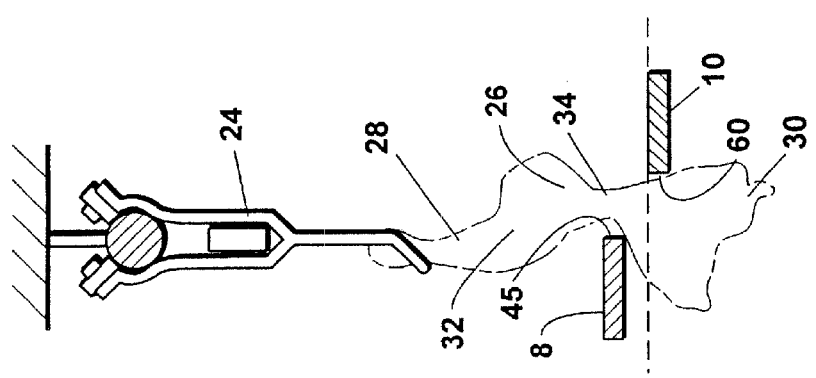
Figure 4:
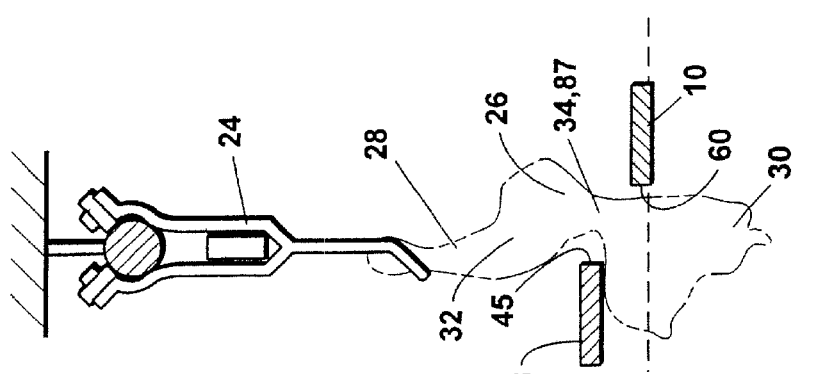
Figure 14:
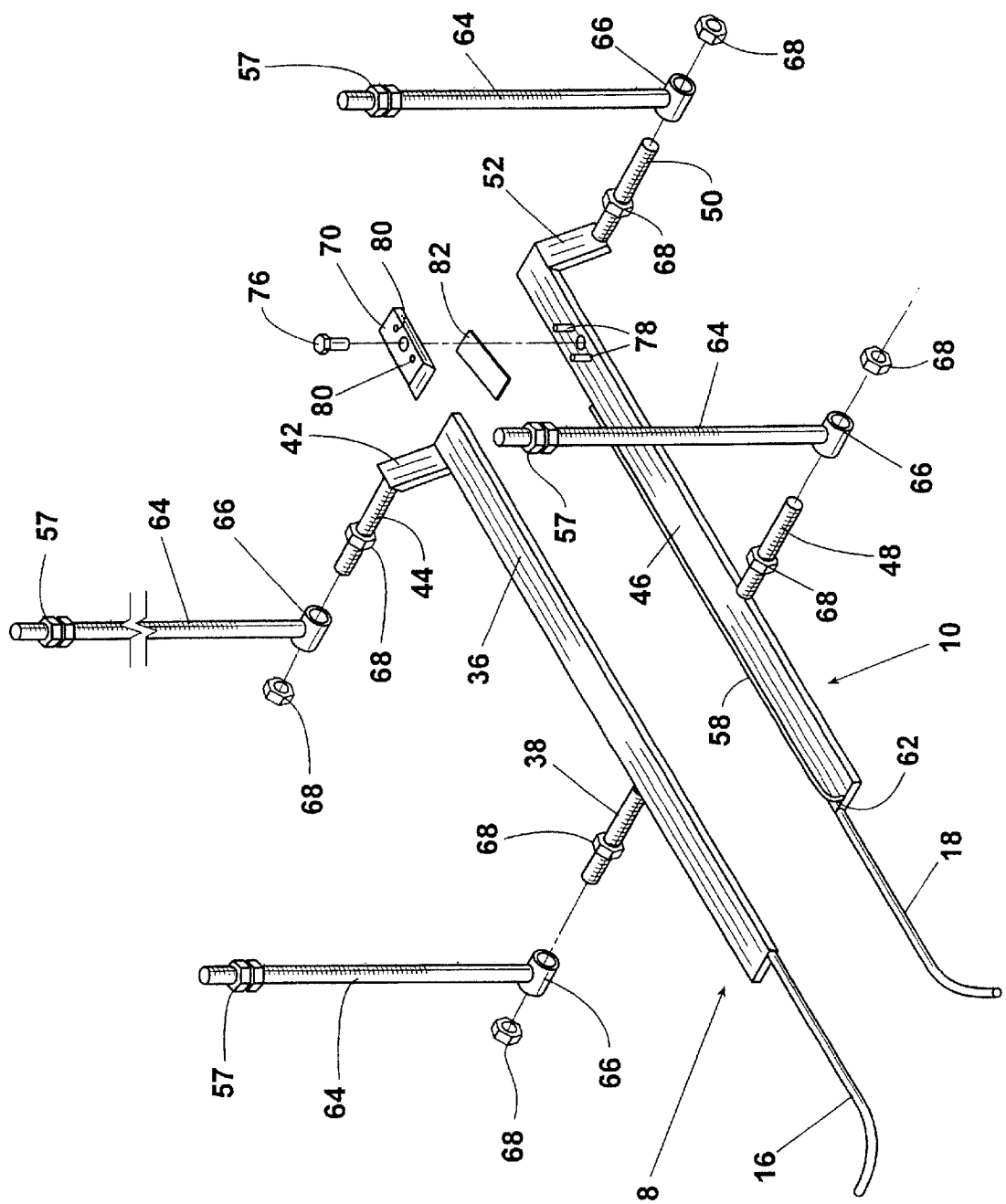
FIG. 14 provides an exploded perspective view of front and back rail structures 8 and 10.
Figure 15:
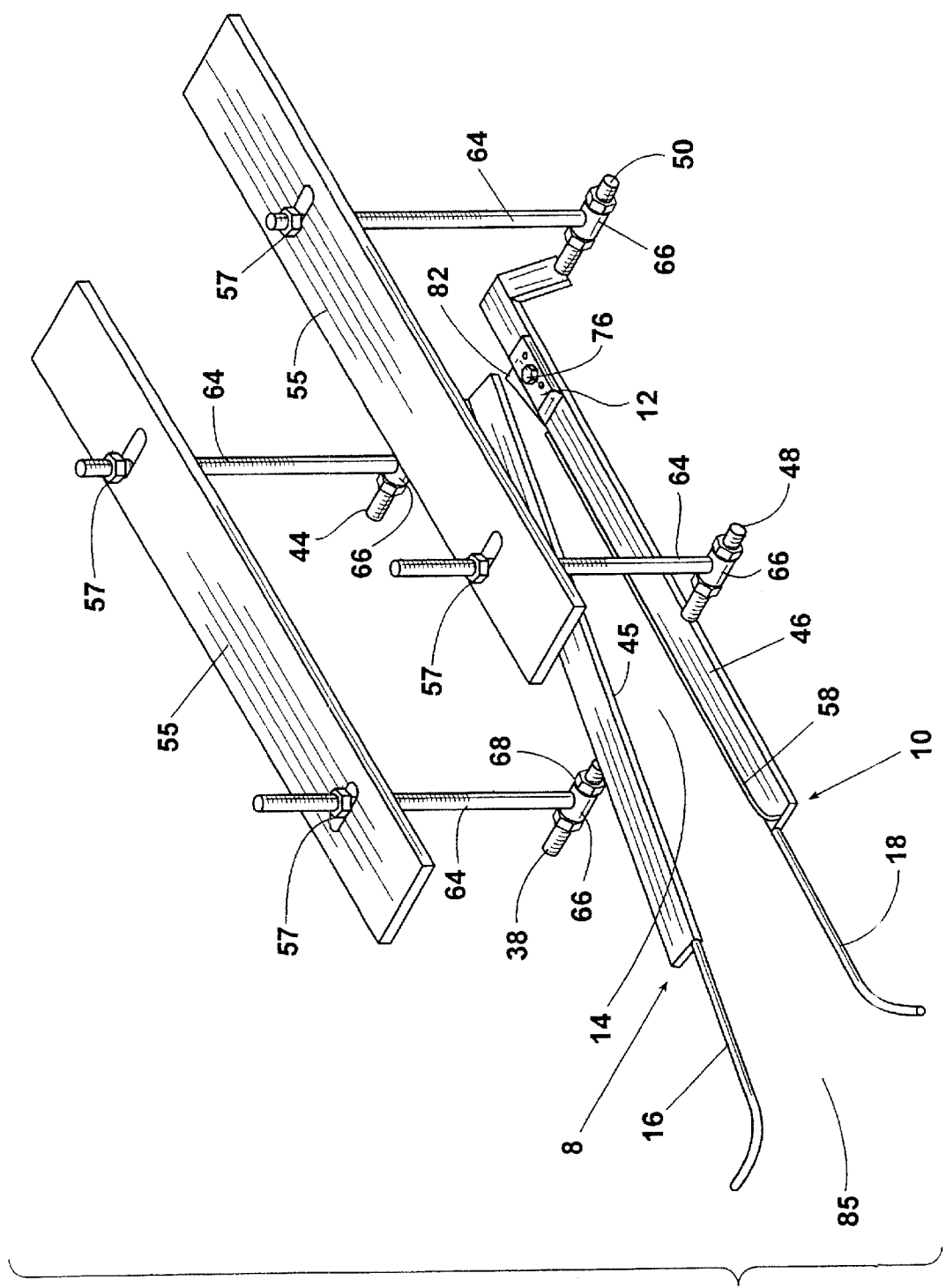
FIG. 15 provides an assembled perspective view of front and back rail structures 8 and 10 and showing support members.
Figure 16:
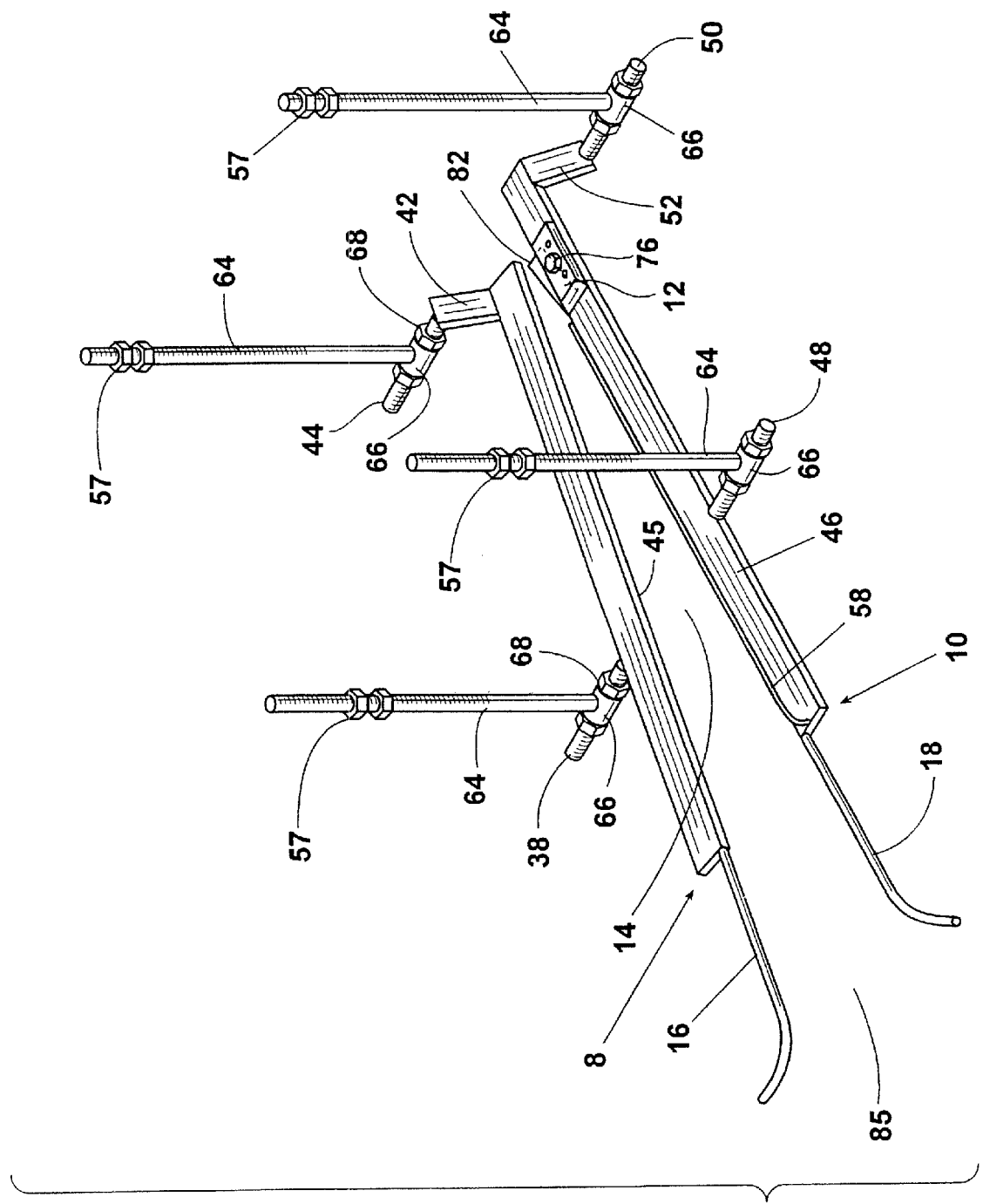
FIG. 16 provides an assembled perspective view of front and back rail structures and not showing support members.
Figure 20:
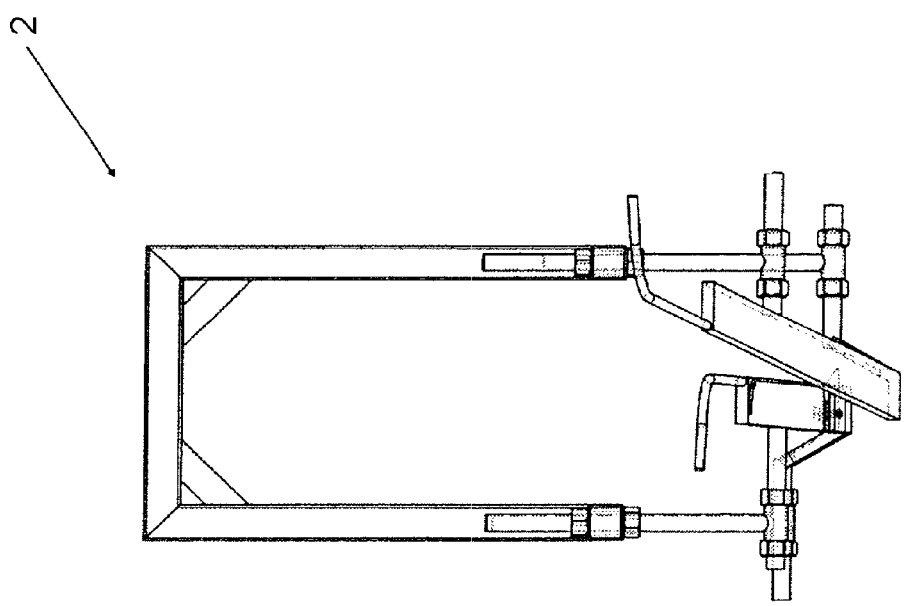
FIG. 20 illustrates a view of the inventive secondary halving apparatus.
Figure 20A:
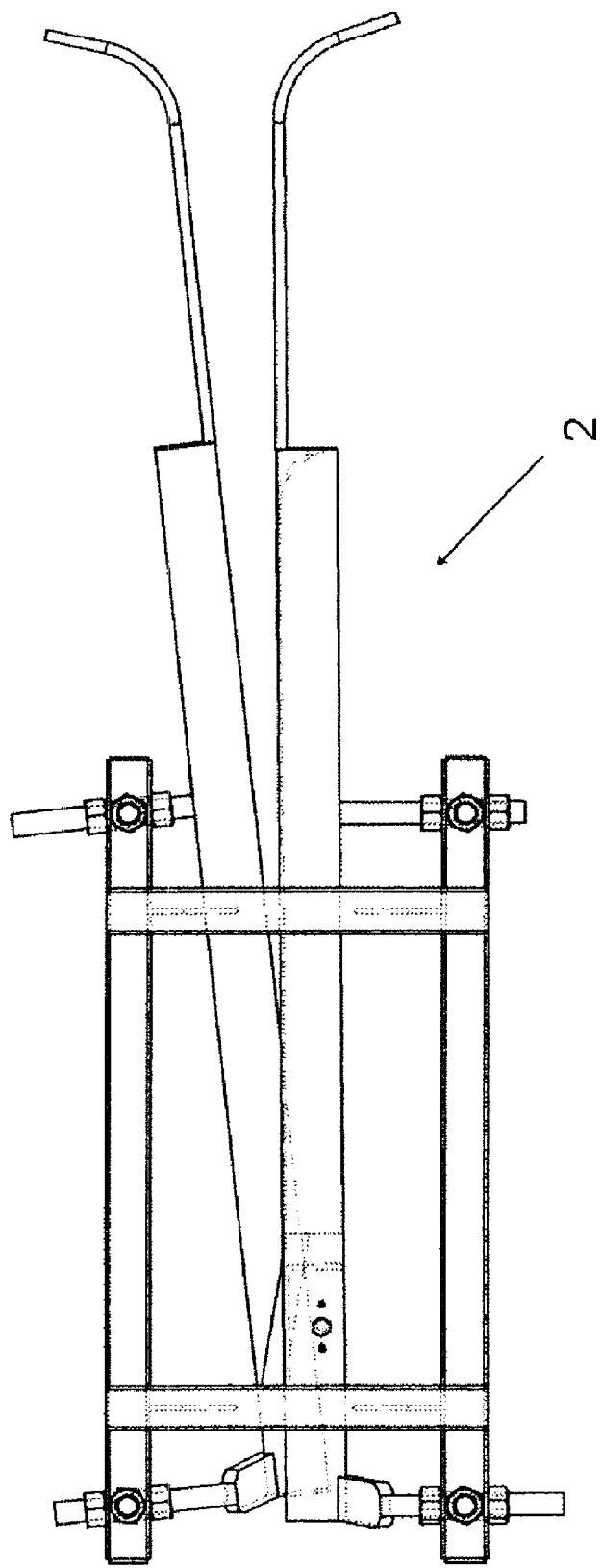
FIG. 20A illustrates a view of the inventive secondary halving apparatus.

For reasons discussed hereinbelow, T-bolts 64 and vertical spaces 42 and 52 are preferably employed to adjustably suspend front rail structure 8 and back rail structure 10 within housing 4 such that (a) each of rails 8 and 10 is inclined downwardly in the direction of travel 84 (direction of conveyance) of poultry carcasses 26 but (b) front rail 8 is inclined at a greater angle than back rail 10 whereby the distal end 86 of front rail 8 is positioned below the distal end 88 of back rail 10 and the outwardly curved rod 16 provided at the initial end of front rail 8 is positioned above the outwardly curved rod 18 provided on the initial end of back rail 10. Additionally, the distal ends 86 and 88 of rails 8 and 10 are preferably closer, in horizontal orientation, than the initial ends thereof such that the lateral gap 14 formed between the rails converges horizontally (i.e., becomes narrower horizontally) toward blade 82 as illustrated in FIG. 3. If necessary to achieve a desired degree of rotation of the front halves 30 of the carcasses as discussed hereinbelow, the degree of horizontal convergence can even be adjusted to the point that the rails 8 and 10 actually cross in the vicinity of the blade 82 as the inventive apparatus 2 is illustrated in FIGS. 20 and 20a.

FIGS. 4–7 provide four sequential views, as seen from the inlet end 85 of inventive apparatus 2, of a carcass 26 as it is conveyed through apparatus 2 toward blade assembly 12. Front rail structure 8 and back rail structure 10 are preferably positioned and respectively inclined within housing 4 such that (a) the outwardly curved rods 16 and 18 provided at the initial ends of the front and back rails 8 and 9 receive the poultry carcasses 26 being conveyed by shackle conveyor 6 and guide the carcasses 26 into gap 14, (b) the outside of the spinal portion 87 of carcass 26 contacts and slides along the inner edge 60 of back rail 10; (c) the breast side of the hanging front half 30 of carcass 26 contacts the inner edge 45 of front rail 8 so that, due to the greater angle of inclination of front rail 8 and the convergence of gap 14, front rail 8 pulls front half 30 downward and pivots front half 30 backward with respect to back half 32 such that the segment of skin 34 attaching front half 30 to back half 32 is placed in a peeling position with respect to front half 30 (i.e., a position wherein front half 30 is pulled or turned with respect to skin segment 34 in the direction 75 shown in FIG. 7), and (d) when thus positioned, carcass 26 is conveyed through blade assembly 12 so that blade 82 cuts the skin segment 34 closely across the backbone portion of the pivoted front half 30 of carcass 26. As a result, almost all of the skin segment 34 is removed from front half 30 and is desirably retained as a part of back half 32.

When the front halves 30 of carcasses 26 are separated from back halves 32, front halves 30 simply drop into product bin 20. The back halves 32, on the other hand, are still retained in shackles 24 and are carried by shackle conveyor 26 to other downstream stations.

Figure 17:
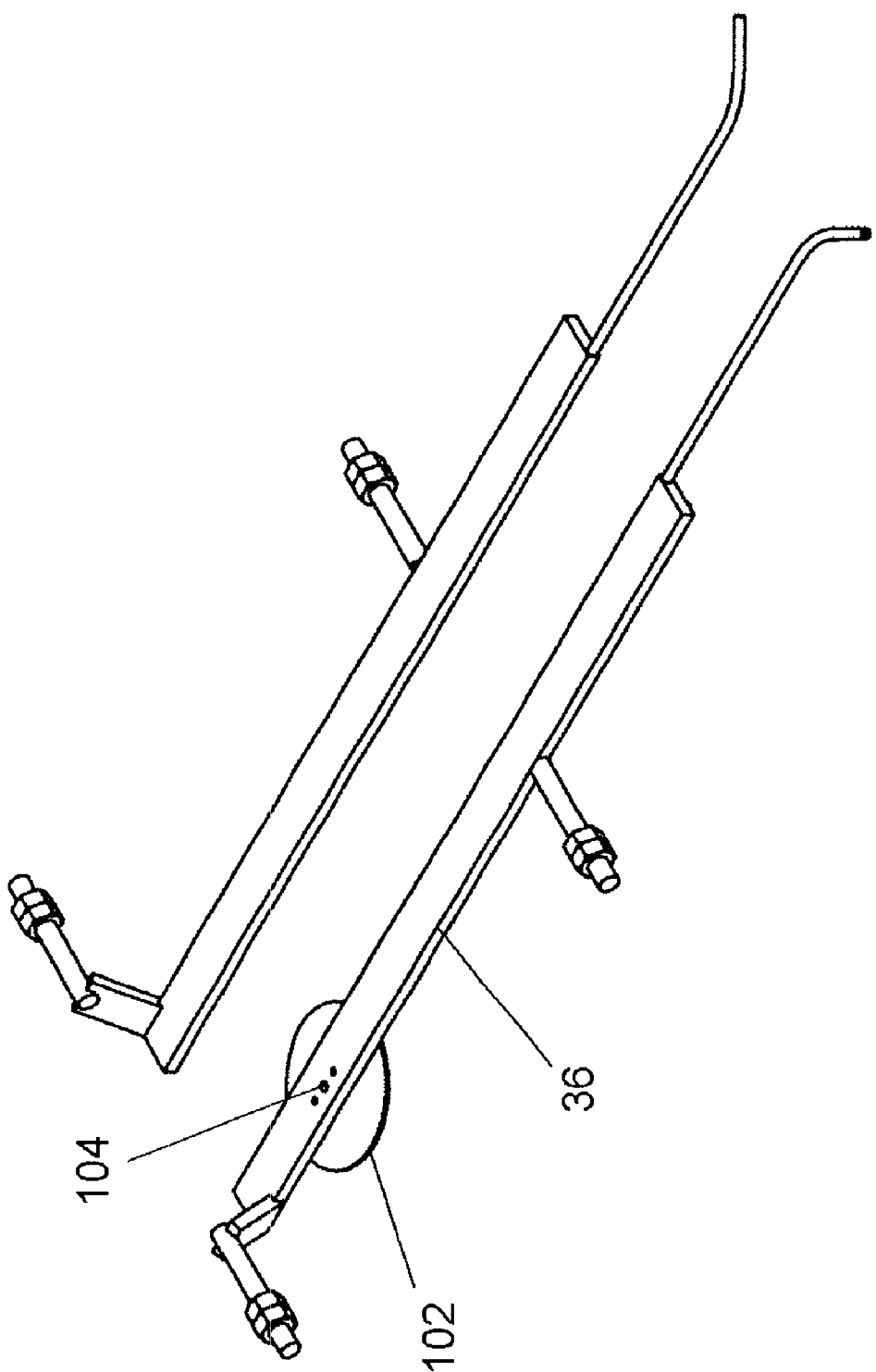
FIG. 17 illustrates a perspective view of the rail structure with the optional circular blade.

Referring to FIG. 17, a perspective view of the rail structure with the optional circular blade is illustrated. The circular blade 102 is mounted on the bar 36 by a selectively loosening mounting member 104 which is preferably a bolt that can be selectively loosened. The mounting member is inserted through the circular blade and attaches to the bar 36. The mounting member 102 can be loosened to allow the circular blade to be rotated about the mounting member thereby providing a fresh cutting edge for cutting the carcass. When one portion of the blade edge dulls, the circular blade can be rotated thereby providing a fresh cutting edge.

Figure 18:
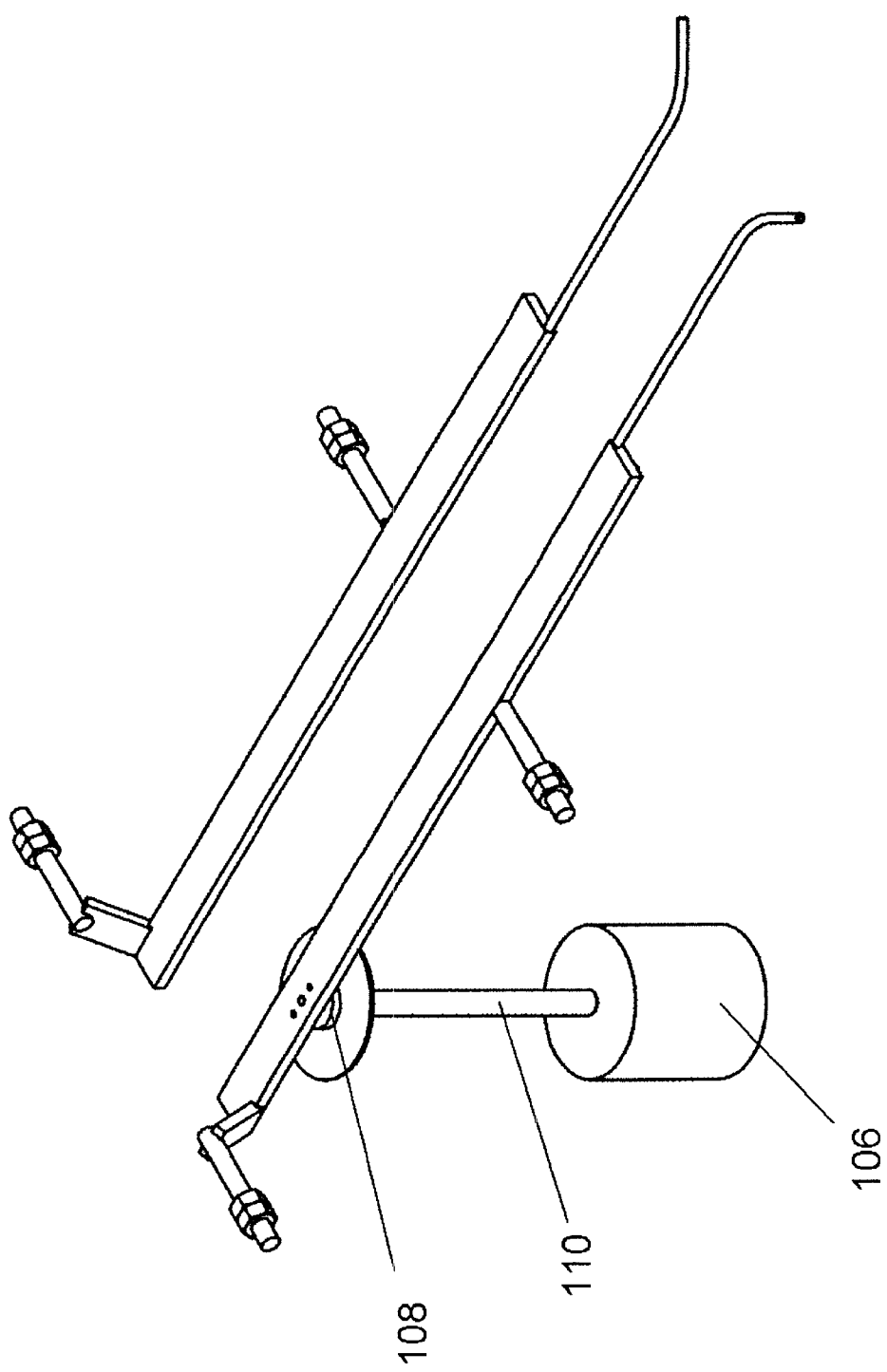
FIG. 18 illustrates a perspective view of the rail structure with the optional circular blade rotatably mounted thereon.
Figure 19:
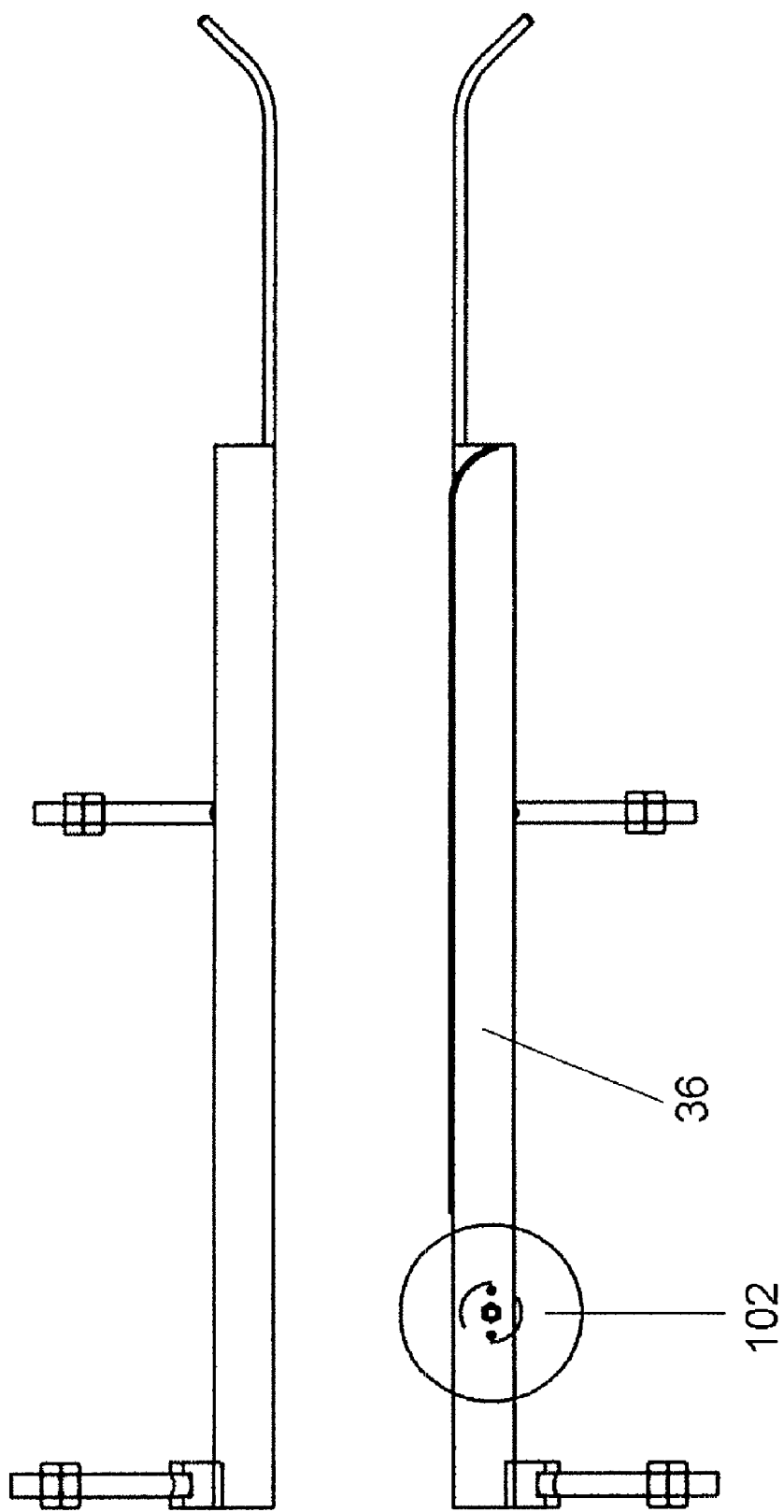
FIG. 19 illustrates a top plane view of the rail structure with the circular blade.

Referring to FIG. 18, a perspective view of the rail structure with the optional circular blade rotatably mounted thereon having a drive 106 is illustrated. This alternative embodiment uses a rotating blade rather than a fixed blade. The circular blade 102 is axially mounted to the bar 36 by bearing member 108. The axle 110 is connected to a drive 106 such as a motor drive. The drive 106 effects rotation of the rotatably mounted circular blade. This embodiment requires less maintenance because the blade edge will not dull as quickly. The circular blade configuration shown in FIGS. 17, 18 and 19 is a design that will be less likely to result in a broken blade. FIG. 19 shows a top plane view of the circular blade configuration. The circular blade 102 is shown centrally mounted to the bar 36 such that the circular cutting edge extends on both sides of the bar.

The various halving apparatus examples shown above illustrate a novel method and apparatus for halving a poultry carcass. A user of the present invention may choose any of the above halving apparatus embodiments, or an equivalent thereof, depending upon the desired application. In this regard, it is recognized that various forms of the subject halving apparatus could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for cutting poultry carcasses as they are continuously conveyed by a shackle conveyor having a plurality of shackles, wherein said poultry carcasses have been previously processed such that each of said poultry carcasses includes a back half comprising two legs retained in said shackles and a front half which has been partially cut away from said back half, said back half further comprises two thighs and a back portion of a spine of said poultry carcass, said front half comprises a front portion of said spine, and said front half hangs from said back half by at least a segment of skin extending between said back and said front portions of said spine, said apparatus comprising:

a nonrotating back rail and;

a nonrotating front rail positioned adjacent to said back rail such that a gap is provided between said front rail and said back rail, said gap being positioned such that said poultry carcasses will travel into said gap as said poultry carcasses are conveyed by said shackle conveyor and said back rail and said front rail will each be positioned adjacent to but on opposites of said spine;

wherein, as each said poultry carcass travels into said gap, the exterior thereof adjacent said spine will contact and slide along said back rail and wherein said front rail converges in a horizontal direction toward said back rail and has a downward slope such that said downward slope will act to pull said front half downward with respect to said back half and the convergence of said front rail toward said back rail in said horizontal direction will operate to pivot said front half backward with respect to said back half, against said back rail, to thus place said segment of skin in a peeling position with respect to said front portion of said spine; and said apparatus further comprising a circular cutting means positioned for cutting said segment of skin from said front portion of said spine while said segment of skin is in said peeling position such that said front half is separated from said back half and at least most of said segment of skin remains attached to said back half.

2. The apparatus of claim 1 wherein said circular cutting means comprises a blade selectively rotatably secured on said back rail such that the blade is selectively rotatable to provide a fresh cutting edge.

3. The apparatus of claim 1 further comprising a frame through which said shackle conveyor will continuously deliver said poultry carcasses, said back rail and said front rail being adjustably positioned within said frame.

4. The apparatus of claim 1 further comprising guiding means for guiding said poultry carcasses into said gap.

5. The apparatus of claim 4 wherein said guiding means comprises a pair of outwardly reaching rods extending from said rails.

6. The apparatus of claim 1 wherein said gap has an inlet end and said front rail is downwardly inclined from said inlet end.

7. The apparatus of claim 6 wherein said front rail is inclined from said inlet end to a degree greater than any downward inclination of said back rail.

8. The apparatus of claim 7 wherein said back rail is also downwardly inclined from said inlet end.

9. The apparatus of claim 1 wherein said front rail and said back rail converge horizontally toward said circular cutting means.

10. The apparatus of claim 1 wherein: each of said front rail and said back rail has an upstream end and a downstream end; said upstream end of said front rail is positioned at an elevation higher than that of said upstream end of said back rail; and said downstream end of said front rail is positioned at an elevation lower than that of said downstream end of said back rail.

11. The apparatus of claim 1 wherein said circular cutting means comprises a rotatable circular cutting blade operatively connected to a drive for effecting rotation of said circular cutting blade.

12. An apparatus for cutting animal carcasses as they are continuously conveyed by a shackle conveyor comprising:

an elongated back rail inclined downwardly at an angle of incline in a direction of conveyance;

an elongated front rail adjacent said back rail and proximately spaced from said back rail forming a gap therebetween operable for conveying a partially halved carcass along said gap, and said front rail downwardly inclined in the direction of conveyance at a greater angle than the angle of incline of the back rail such that a distal end of the front rail is positioned below a distal end of the back rail;

said front rail and said back rail oriented to inwardly converge horizontally toward the distal end of the front rail and the distal end of the back end for pivoting a front half of the carcass backward; and a cutting blade mounted to said back rail proximate the distal of the back rail and positioned for halving the carcass.

13. The apparatus of claim 12 further comprising a frame through which said shackle conveyor will continuously deliver said carcasses, said back rail and said front rail being adjustably positioned within said frame.

14. The apparatus of claim 12 wherein the front rail and back rail each further comprises a front and back outwardly reaching rod respectively extending from said rails for guiding the carcass into the gap.

15. The apparatus of claim 12 wherein said cutting blade is a circular cutting blade and is selectively rotatably mounted to said back rail.

16. The apparatus of claim 15 wherein said circular cutting blade is operatively connected to a drive for effecting rotation of said circular cutting blade.

* * * * *